United States Patent [19]

Van der Lely et al.

[11] Patent Number: 5,042,428
[45] Date of Patent: Aug. 27, 1991

[54] IMPLEMENT FOR MILKING AN ANIMAL

[75] Inventors: Edwin Van der Lely, Maasland; Karel Van den Berg, Bleskensgraaf, both of Netherlands

[73] Assignee: C. van der Lely N.V., Maasland, Netherlands

[21] Appl. No.: 410,405

[22] Filed: Sep. 21, 1989

[30] Foreign Application Priority Data

Sep. 21, 1988 [NL] Netherlands ............ 8802332

[51] Int. Cl.$^5$ .................................... A01J 3/00
[52] U.S. Cl. ............................ 119/14.08; 119/14.1; 119/14.18
[58] Field of Search ............ 119/14.01, 14.02, 14.04, 119/14.13, 14.18, 14.1

[56] References Cited

U.S. PATENT DOCUMENTS

| | | | |
|---|---|---|---|
| 3,726,252 | 4/1973 | Needham et al. | 119/14.08 |
| 4,010,714 | 3/1977 | Notsuki et al. | 119/14.03 |
| 4,223,635 | 9/1980 | Ackermann | 119/14.02 |
| 4,508,058 | 4/1985 | Jakobson et al. | 119/14.02 |
| 4,685,422 | 8/1987 | Middel et al. | 119/14.13 |
| 4,726,322 | 2/1988 | Torsius | 119/14.14 |
| 4,748,936 | 6/1988 | Esch | 119/14.02 |
| 4,805,557 | 2/1989 | van der Lely et al. | 119/14.08 |
| 4,805,559 | 2/1989 | van der Lely et al. | 119/14.1 |
| 4,838,207 | 6/1989 | Bom et al. | 119/14.02 |

FOREIGN PATENT DOCUMENTS

| | | |
|---|---|---|
| 0091892 | 10/1983 | European Pat. Off. . |
| 0098558 | 1/1984 | European Pat. Off. . |
| 0191517 | 8/1986 | European Pat. Off. . |
| 0194729 | 9/1986 | European Pat. Off. . |
| 232568 | 12/1986 | European Pat. Off. ......... 119/14.08 |
| 0213660 | 3/1987 | European Pat. Off. . |
| 0229682 | 7/1987 | European Pat. Off. . |
| 0258938 | 3/1988 | European Pat. Off. . |
| 0300582 | 1/1989 | European Pat. Off. . |
| 2595197 | 9/1987 | France . |
| 8503580 | 7/1987 | Netherlands . |
| 2007486 | 5/1979 | United Kingdom . |

*Primary Examiner*—John G. Weiss
*Assistant Examiner*—R. Thomas Price
*Attorney, Agent, or Firm*—Penrose Lucas Albright

[57] ABSTRACT

An implement for the automated milking an animal, such as a cow. The implement comprises a segmented robot arm that can be adjusted to place a working platform in an initial position between the animal's front and rear legs generally below the udder. Mounted on the working platform are teat cups, a reciprocating rotary laser sensor, microprocessor for control, and an electromagnetic coupling device for carrying each teat cup in turn to attachment with a teat. The implement also has a contact sensor and an animal recognition system. Data provided from the contact sensor and animal recognition system provide a template for where the teats should be found. Microprocessor control of the robot arm and platform result in a two phase detection and attachment sequence for sequentially attaching the teat cups to first the rear and then the front teats.

35 Claims, 7 Drawing Sheets

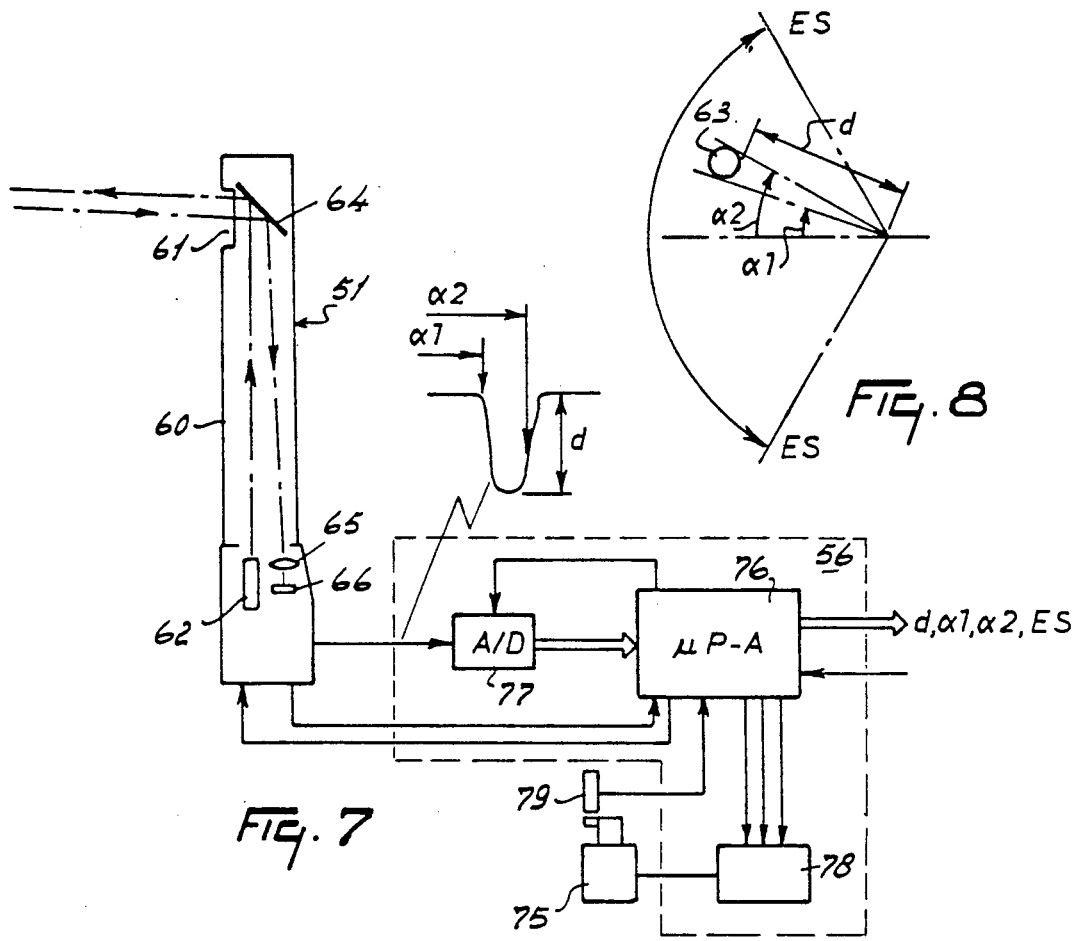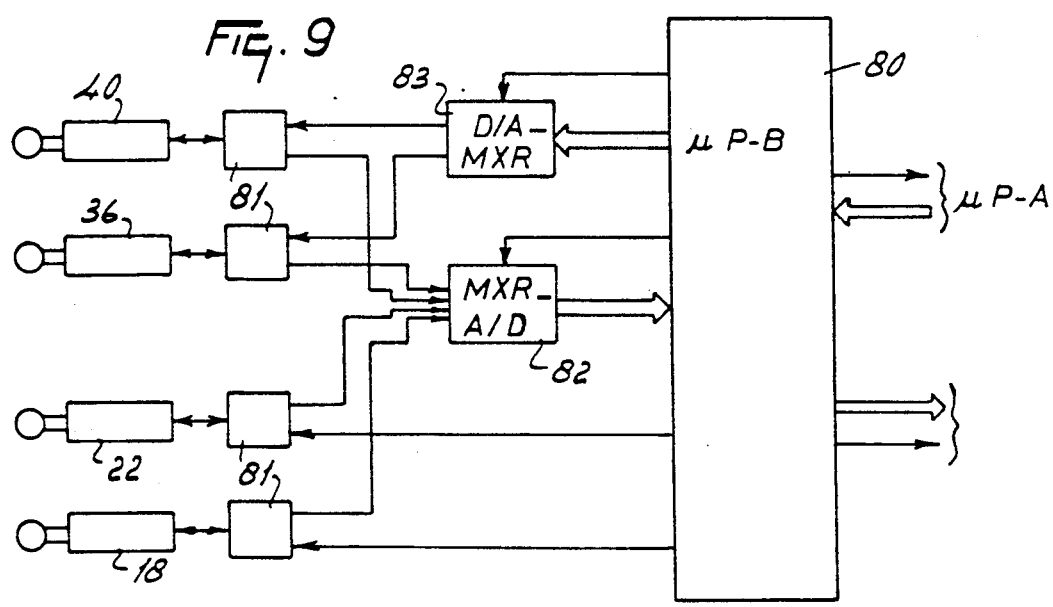

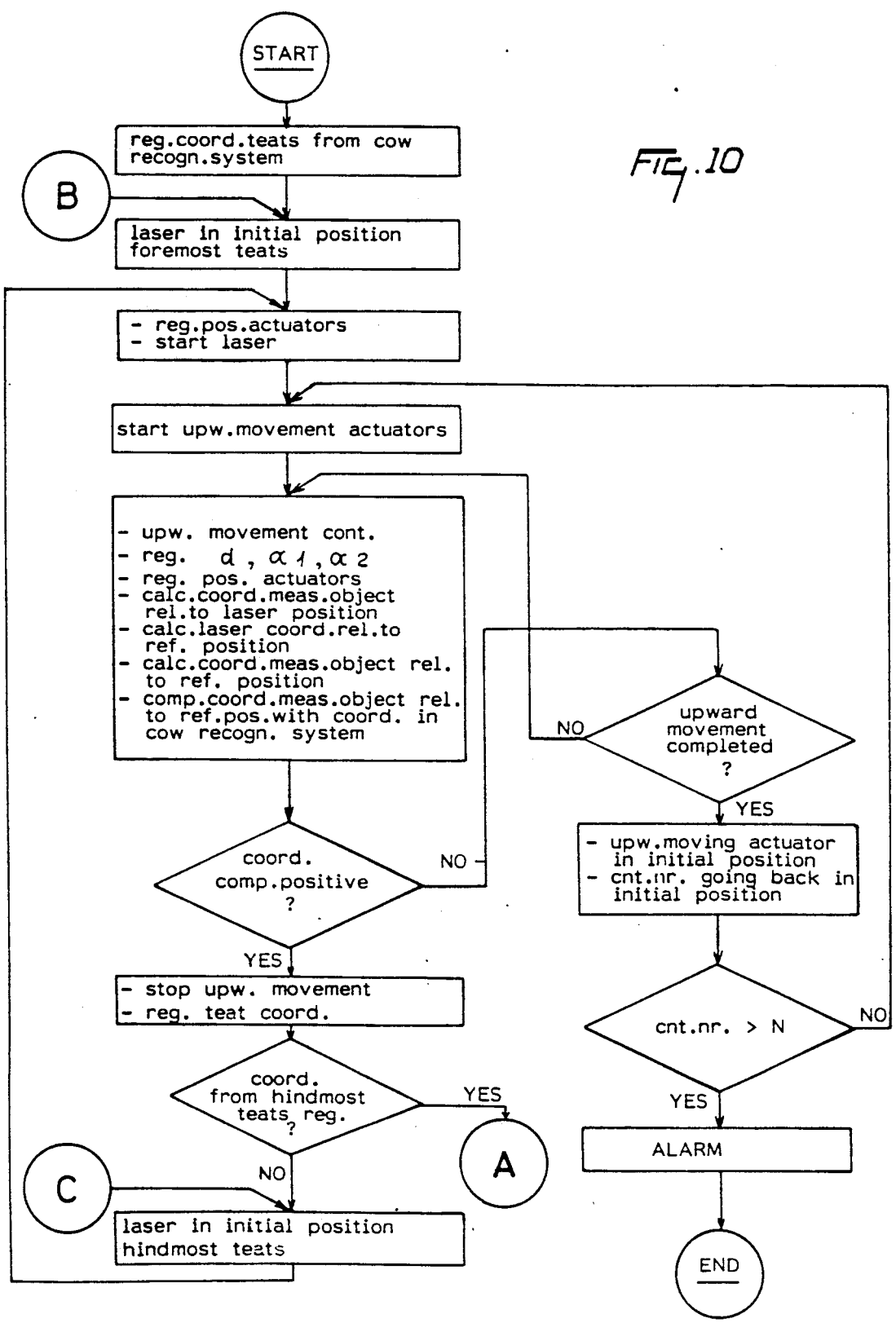

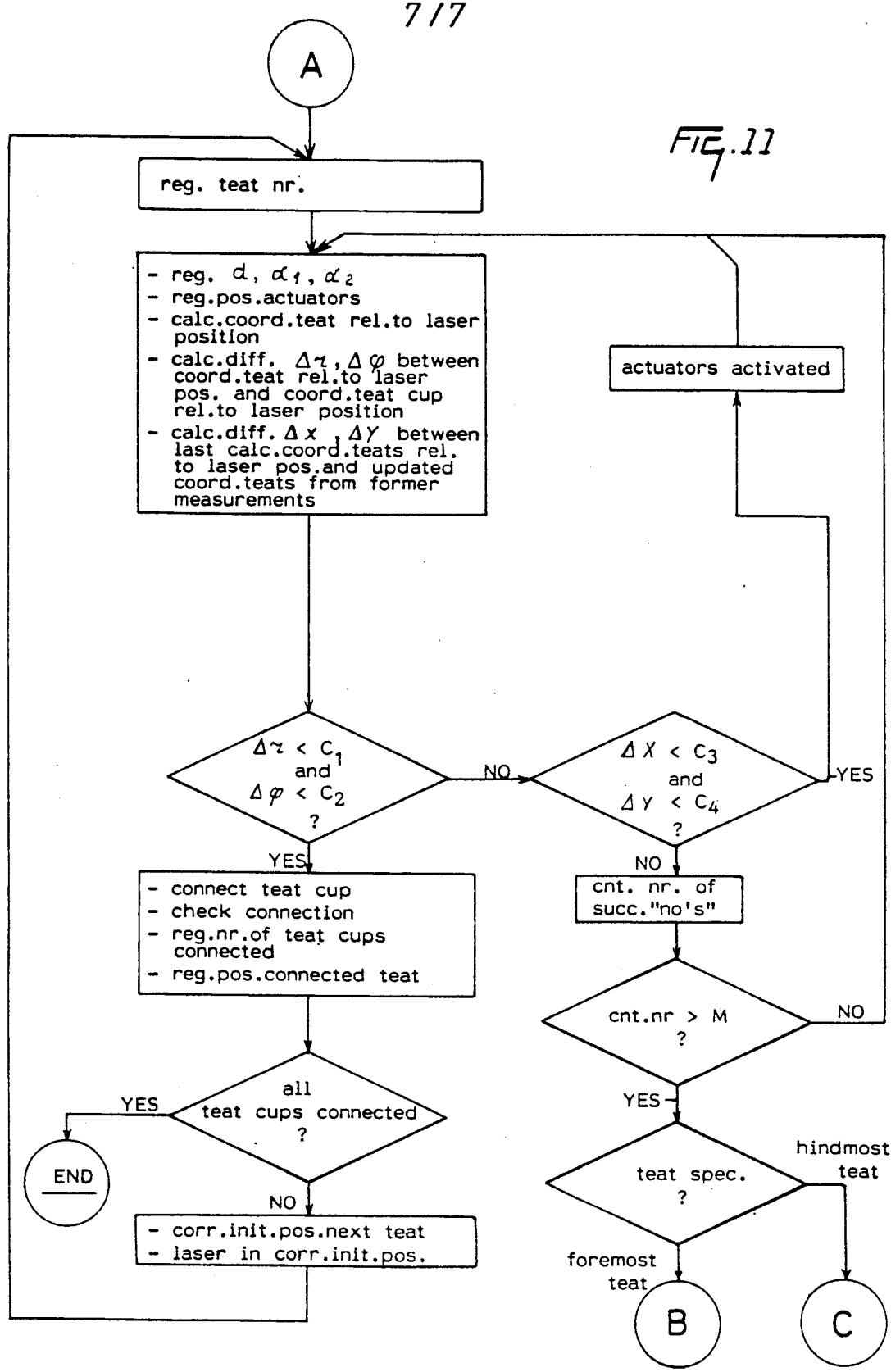

IMPLEMENT FOR MILKING AN ANIMAL

SUMMARY OF THE INVENTION

The present invention relates to an implement for milking an animal such as a cow. The implement includes a robot arm adapted to carry near its end one or more teat cups and coupling means for applying each teat cup to a relevant teat of the animal's udder. In addition there are provided sensor means, to aid in determining the position of the teats, and control means for conveying, on the basis of a position as determined by the sensor means, the robot arm to a position under the animal's udder such that a teat cup can be applied to the relevant teat.

In automating the milking operation, so that milking the animals may be effected without the presence of any operating staff or with supervising staff only, it is of the utmost importance that one of the most critical procedures, that is, the application of the teat cups to the teats, be effected reliably and efficiently. In addition, a relatively cheap implement for doing so is desired.

In actual practice, the luring of an animal to be milked to a milking parlor, normally by placing fodder therein, has been found not to be very difficult. Once the animal is in the milking parlor, she can be positioned therein in the customary manner by providing a boundary at the front side of the milking parlor. The animal tends to bear against the boundary as she tries to reach with her head for a trough located farther away. When the width of the milking parlor is restricted, the position of the animal ready to be milked is substantially defined. Once the animal has been positioned in the milking parlor, and the animal identified by means of an animal recognition system, available information about the relevant animal can be used. This information includes inter alia the period of time elapsed since the animal was milked last, the dimensions of the animal, the approximate position of the teats on the udder, etc. On the basis of this information, the robot arm can be adjusted to a starting position such that the sensor means can detect the teats with a high degree of probability. Upon detection, the robot arm can then be adjusted from its starting position to a desired position.

The invention has for its object providing an implement for milking an animal, the implement determining the position of the teats on the animal's udder relative to the end of the robot arm, and hence relative to the relevant teat cups, in a comparatively simple and fast manner.

According to the invention, the implement of the above-defined type is characterized in that the sensor means is arranged on a movable member provided near the end of the robot arm. The sensor means can be arranged such that the teats are observed accurately. Although the moveable member can be arranged pivotably with respect to the robot arm end, it is preferred to have the movable member be a slide. In particular, the movable member is movable along the end of the robot arm in the longitudinal direction thereof, while the sensor means is provided rotatably or in a specific embodiment pivotably on the movable member. According to the invention, the movable member can be adjusted by means of the sensor means to a first position wherein the position of the front teats can be determined and to a second position for determining the position of the rear teats. The pivotability of the sensor means ensures that in both positions an accurate determination of the position of the concerned two teats is possible. In a preferred embodiment, the movable member is provided with pivotal means, which enables the sensor means to pivot through an angle which extends symmetrically relative to the longitudinal direction of the robot arm end. Preferably, this angle is in a range from 90° to 150° and in particular amounts to approximately 120°. The pivotal means may comprise a stepper motor and a pivotal mechanism for the sensor means driven thereby or a bi-directionally controllable stepper motor.

According to the invention, the sensor means comprises at least one transmitter element accommodated in a housing which is secured on the movable member and includes a window, the scanning beam transmitted by the transmitter element being directed through the window and across the teat cups carried by the robot arm end, preferably in a substantially horizontal direction. In principle, the transmitter element may be a source of electromagnetic radiation having a suitably selected frequency. Besides infrared radiation elements, in a particularly favorable manner lasers may be used. Lasers provide a very narrow scanning beam and produce a relatively high data rate. Therefore, the invention also relates to an implement for milking an animal, such as a cow, in which the implement, with the aid of sensor means, determines the position of the teats in order to be able to connect teat cups thereto, wherein the sensor means comprises a source of electromagnetic radiation, such as a source of infrared radiation or a laser. Using a laser in the sensor means, together with servo-pneumatic cylinders for controlling the robot arm, produces a highly responsive system that enables efficient connection of the teat cups when the animal to be milked exhibits restless behavior. The laser is arranged in the housing such that either directly, or via a reflecting element, a substantially horizontal scanning beam is obtained which enables a most efficient determination of the position of a teat. According to the invention, the housing also accommodates a receiver element for detecting, through the window provided therein, a fraction of the scanning beam radiation dispersed by and/or reflected from an object, specifically, a teat of the animal's udder. In a preferred embodiment, there is provided in the housing, behind the window therein, a reflecting element, for example, a flat mirror, for guiding the radiation incident into the housing through the window downwardly to the receiver element arranged in the lower part thereof. Preferably, the receiver element comprises a diode detector. Between the reflecting element and the receiver element there is arranged a converging lens. The mode of operation of the above-described sensor means is based on the principle that the scanning beam radiation, dispersed by and/or reflected from the teats located at different distances from the sensor means, is incident with a relatively small angular difference onto the reflecting element in the housing and subsequently, via the lens, onto a different location of the diode detector, so that the location where the radiation is focused, to a greater or lesser extent, on the diode detector determines the distance at which the relevant teat is located from the sensor means and consequently from the end of the robot arm.

In accordance with the invention, in order to be able to determine as accurately as possible the position of the teats, which are continuously moving, it is advantageous for the sensor means to comprise two sensor elements which are arranged side by side in such a manner that two distance measurements can be performed in a substantially horizontal plane. Once the position of the teats has been determined roughly, the rotational or pivotal movement can be stopped and the two beams transmitted by the separate sensor elements can be centered on one specific teat, as a result of which the position of the relevant teat relative to the robot arm end can be measured. Upon movement, the relevant teat can be followed by controlling the sensor means to keep the beams transmitted thereby centered on the teat and by controlling the robot arm. When the relevant teat cup is in the correct position under the teat, it can be connected. When two sensor elements are used, they may comprise two transmitters for parallel laser beams or for ultrasonic beams of varied wavelength.

With the object effecting an accurate teat position determination, both before and during the upward movement of the teat cups, in accordance with a further feature of the invention, it is advantageous for the coupling means, as well as the sensor means, to be arranged on the movable member. Preferably, the coupling means are arranged on the movable member near its end and in front of the sensor means. In an advantageous embodiment, the coupling means are arranged pivotably on the movable member. The coupling means are pivotal through an angle, which extends symmetrically relative to the longitudinal direction of the robot arm end between two angular positions. Preferably, the angle is in a range from 50° to 130° and in particular amounts to approximately 90°. When the teat cups intended for the rear teats are arranged on the robot arm end closer to each other than those intended for the front teats, the pivotal angle for connecting the rear and front teat cups may be selected differently, for example, 60° and 120° respectively. The pivotal means may comprise a cylinder connected to the movable member, the cylinder controlling a pivoting mechanism provided on the lower part of the coupling means.

In an advantageous embodiment according to the invention, during the tracking and connecting phase the movable member can be adjusted to a first position, in which the position of the rear teats are determined using the sensor means and from which the coupling means can engage the respective teat cups, to be placed on the rear teats, by assuming the angular positions determined by the pivotal means of the coupling means, and to a second position in which the position of the front teats can be determined by the sensor means and in which the coupling means can engage the respective teat cups, to be placed on the front teats, by assuming the appropriate angular positions. Therefore, by adjusting the movable member to a first and second position and by having the coupling means assume a first and a second angular position, the four teat cups required for milking a cow can be gripped sequentially. The gripping itself is effected by energizing an electromagnet forming part of the coupling means. The electromagnet is positioned at the relevant angular position of the coupling means directly in front of the relevant teat cup to be moved upwardly. The coupling means includes an outer jacket to which the electromagnet is fitted, and a vertical inner jacket which is connected rigidly to the movable member such that it is possible for the outer jacket with the attached electromagnet, and a teat cup engaged thereby, to be moved in the upward direction.

In addition, the movable member is provided with control and data processing electronics for the transmitter and receiver elements associated with the sensor means.

The invention also relates to a method of connecting teat cups to the teats of the udder of an animal, for example, a cow. The position of the teats is determined by a sensor means and then the end of a robot arm holding the teat cups is adjusted by means of adjusting cylinders to position the teat cup for connection to the teats by means of a substantially upward movement of the relevant teat cups. In accordance with the invention, the method is performed efficiently in two phases. In the first phase, the position of the paired front or rear teats is determined and compared with the data regarding the position of the teats from an animal recognition data source. In the second phase each of the teat cups is adjusted successively to a position substantially directly below a relevant teat for connection thereto. According to the invention, position determination and control of the robot arm end, under the animal's udder, are effected by means of a microprocessor, which is supplied with data regarding the objects detected by the sensor means, the teat positions from the animal recognition data source as well as the actual position of the cylinders of the robot arm. Using the supplied data, the desired position of the cylinders in the two phases is determined by the microprocessor. In the first phase, the position of the teats is determined during an upward movement of the sensor means from a position under and centrally positioned in front of a relevant pair of teats, the scanning beam of the sensor means extending substantially in a horizontal plane. The sensor means may be arranged such that it is movable in an upward direction relative to the robot arm end or it may be mounted rigidly thereon, so that the robot arm end and sensor means move upward together. When the data received by the sensor means have been processed, which, according to the invention, may be done in a separate microprocessor, and the data has been recognized as originating from the animal's teats, the upward movement of the sensor means can be stopped and the operation proceed to the second phase, that is the tracking and connecting phase.

For a better understanding of the present invention and to show how the same may be carried into effect, reference will now be made, by way of example, to the accompanying drawings.

BRIEF DESCRIPTION OF THE DRAWINGS

FIG. 7 shows a laser arrangement with associated electric and electronic elements;

FIG. 8 illustrates the position of the teats relative to the parameters describing the laser;

FIG. 9 is a block diagram of a circuit for controlling the connection of the teat cups to the teats of an animal's udder;

FIG. 10 is a flow diagram of the teat searching procedure used in the microprocessor that is part of the circuit shown in FIG. 9; and FIG. 11 is a flow diagram of the teat tracking procedure used in the microprocessor constituting part of the circuit shown in FIG. 9.

DESCRIPTION OF THE PREFERRED EMBODIMENT

Figure 1:
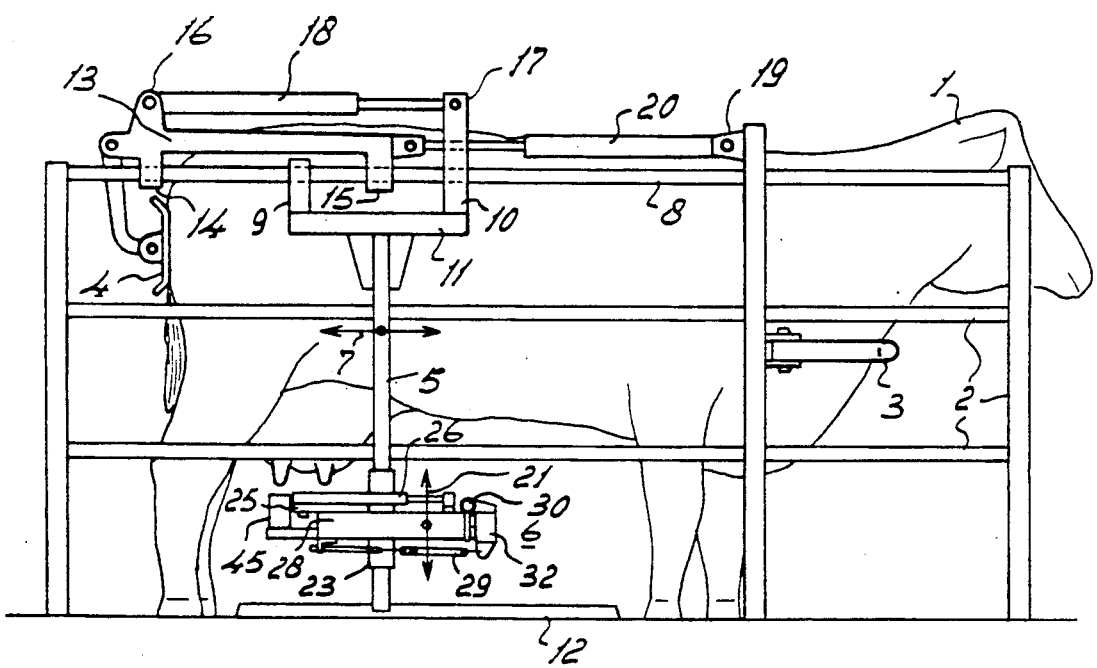
FIG. 1 is a side view of a robot arm as arranged at the side of a milking parlor.

In the drawings, corresponding components have been denoted by the same reference numerals. The invention is not limited to the embodiment as shown and described herein, the embodiment serves to illustrate the inventive concept.

Figure 2:
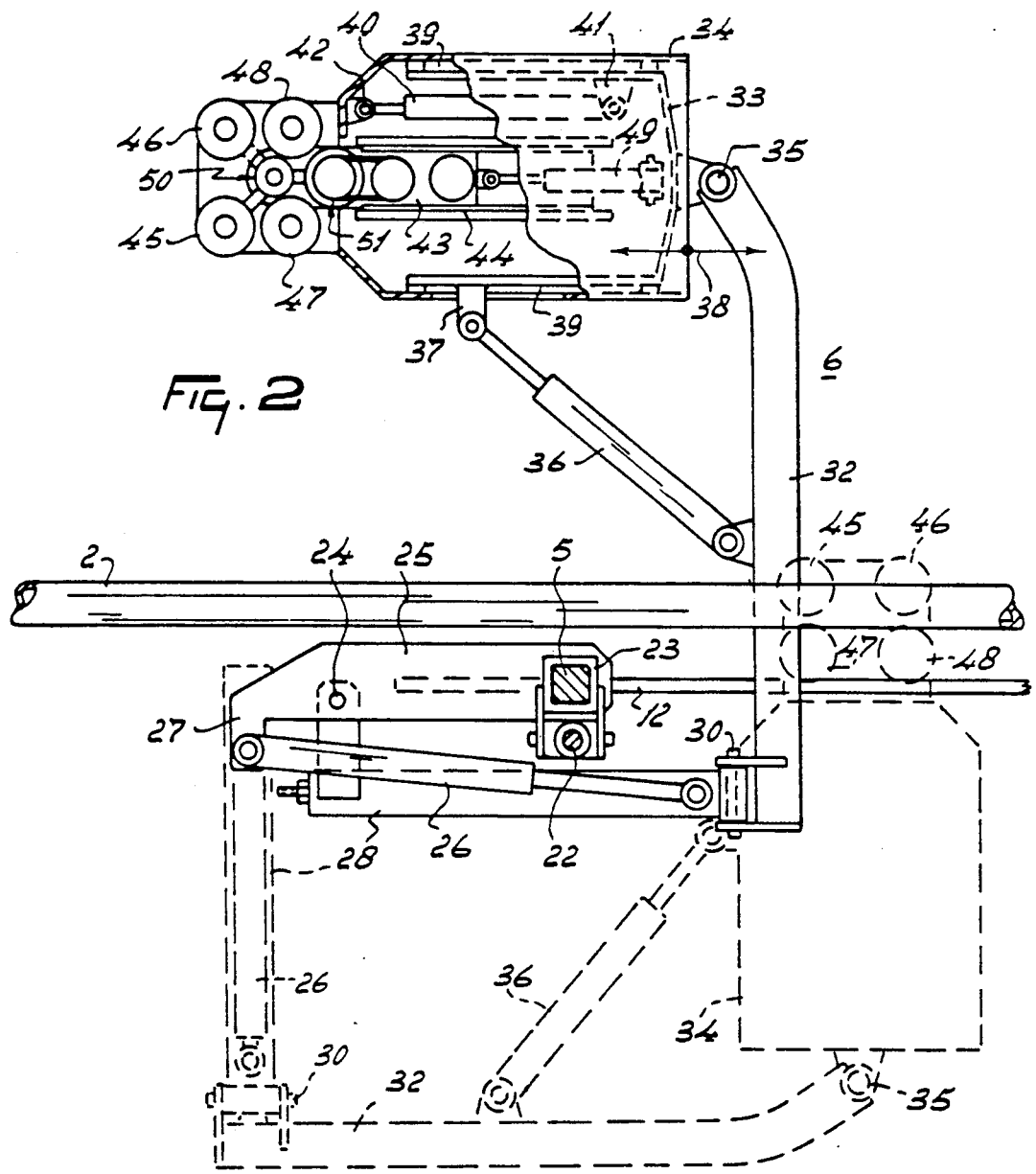
FIG. 2 is a plan view of the robot arm.

A robot arm 6, according to the invention, is shown in FIGS. 1 and 2. The robot arm 6 is arranged at the side of a milking parlor. Once the animal to be milked has arrived in the milking parlor and has been positioned appropriately therein, robot arm 6 is moved, on the basis of animal recognition data, from the front side to under the animal's udder.

FIG. 1 shows an animal 1 present in the milking parlor. The milking parlor is enclosed by a railing 2 which limits the freedom of movement of animal 1 in a lateral direction. The animal enters the milking parlor from the rear. A pivotal stop 3 located near the front of the milking parlor constitutes a limit to the animal's 1 movement in the forward direction. By providing a feed unit at the front of the milking parlor, the animal will advance until she is against stop 3.

The milking parlor floor has a recess arranged such that the animal will not put her hind feed therein. The recess bottom extends obliquely inwardly and downwardly. As the hind legs of the animal are wide apart, they are positioned to the sides of the recess. The recess may have a drain for discharging the animal's excrements.

Once the animal has entered the milking parlor, a sensor device 4 is pivoted against her hindquarters. At the side of the milking parlor there is arranged a substantially vertical frame beam 5. Frame beam 5 is provided with a longitudinal guide means at its upper end and has a robot arm 6 attached near its lower end. Vertical frame beam 5 is capable of moving longitudinally, or along the longitudinal axis of the animal and the milking parlor, with respect to the milking parlor, as denoted by the arrows 7. For that purpose, railing 2 is provided with a guide rod 8 along which two interconnected slide blocks 9 and 10 can move. Slide blocks 9 and 10 are connected by a horizontal frame beam 11 which is secured to the top of vertical frame beam 5. Near the floor, the lower portion of frame beam 5 is guided by sliding along guide rail 12.

Sensor device 4 is connected pivotably to a slide element 13. Such element 13 is slidably mounted on guide rod 8 by means of two slide blocks 14 and 15. Rigidly connected between two lugs 16 and 17, on slide element 13 and slide block 10 respectively, is cylinder 18. Cylinder 20 is mounted between slide element 13 and a support 19 on railing 2. By operating cylinder 20, sensor device 4 can be moved towards animal 1 until, in the downward position, it bears against the animal's hindquarters. In the present embodiment, sensor device 4, that is the animal's hindquarters, determine the reference position relative to which the position of the teats and that of the milking robot are determined. By moving sensor device 4 towards animal 1, it is also possible to move frame beam 5. The relative positioning between sensor device 4 and frame beam 5 can be provided adjustably by means of cylinder 18.

Robot arm 6 is adjustable in height (arrows 21) by a slidable connection to frame beam 5. The slidable height adjustment is provided by cylinder 22, one end of which is connected at the junction of frame beams 5 and 11. The other end of cylinder 22 is connected to slide block 23 which provides the slidable height adjustment along the frame beam 5 as a result of the operation of cylinder 22.

Figure 3:
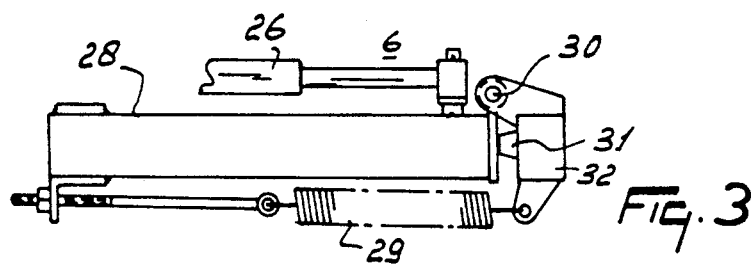
FIG. 3 is a side view of part of the robot arm shown in FIG. 2.

FIG. 2 shows the robot arm 6 both in the rest position (interrupted lines) and in the operational position (uninterrupted lines). Robot arm 6 is pivotally connected by a substantially vertical pivot pin 24 to frame portion 25 which is attached to slide block 23. The pivotal movement is effected by means of a cylinder 26 which has one end connected to a support 27 of frame portion 25 and the other end to first portion 28 of robot arm 6. By operation of cylinder 26, robot arm 6 can be pivoted from the rest position to the operational position and vice versa. It may be of importance for robot arm 6, or a part thereof, to be fixed under spring load in such a manner that it, or the portion thereof, can deflect when, for example, the animal kicks against it. In this embodiment, this can be achieved by having the further portion of robot arm 6, beyond first portion 28, arranged capable of pivoting relative to first portion 28 about a pin 30. The further portion of robot arm 6 pivots against the action of an excess load spring 29. In the unloaded condition, a rubber buffer 31 (see FIG. 3) attached to the further portion of robot arm 6 is pulled against first portion 28 of robot arm 6.

The further portion of robot arm 6 consists of a second portion 32, a third portion 33 and a fourth portion 34. Third portion 33 of robot arm 6 is pivotally connected by means of pivot pin 35 to second portion 32. Pivotal movement about pivot pin 35 is produced by means of a cylinder 36. One end of cylinder 36 is connected to second portion 32 of robot arm 6 and the other end to a support 37 on third portion 33 of robot arm 6. As shown in FIG. 2, by means of cylinder 26, robot arm can be moved to under the animal present in the milking parlor. In such a position, pivot pin 35 is approximately centrally positioned under the animal, that is between the animal's front and rear legs. Thereafter, by adjusting cylinder 36, third portion 33 of robot arm 6 can be pivoted about pivot pin 35 to a desired angle.

The fourth portion 34 of robot arm 6, that is the end of robot arm 6, is movable axially, as indicated by arrows 38, relative to third portion 33. In this regard, support 37 moves in a slot-shaped aperture provided on the side of fourth portion 34 of robot arm 6

In the inserted condition, third portion 33 of robot arm 6 is located partly within fourth portion 34 of robot arm 6. Fourth portion 34 of robot arm 6, being slidable relative to the third portion 33, is provided with rails 39. Attached between third portion 33 and slidable fourth portion 34 is cylinder 40. One end of cylinder 40 is connected via a support 41 to third portion 33 of robot arm 6 and the other end is attached by support 42 to fourth portion 34.

Fourth portion 34 of robot arm 6 can be adjusted along the longitudinal axis, beneath the animal, by means of both cylinder 40 and cylinder 18. Although this adjustment could be obtained using only cylinder 40, by use of cylinder 18 it is possible to limit the stroke of cylinder 40 considerably, which, in view of the restricted space under the animal, is highly advantageous.

Figure 4:
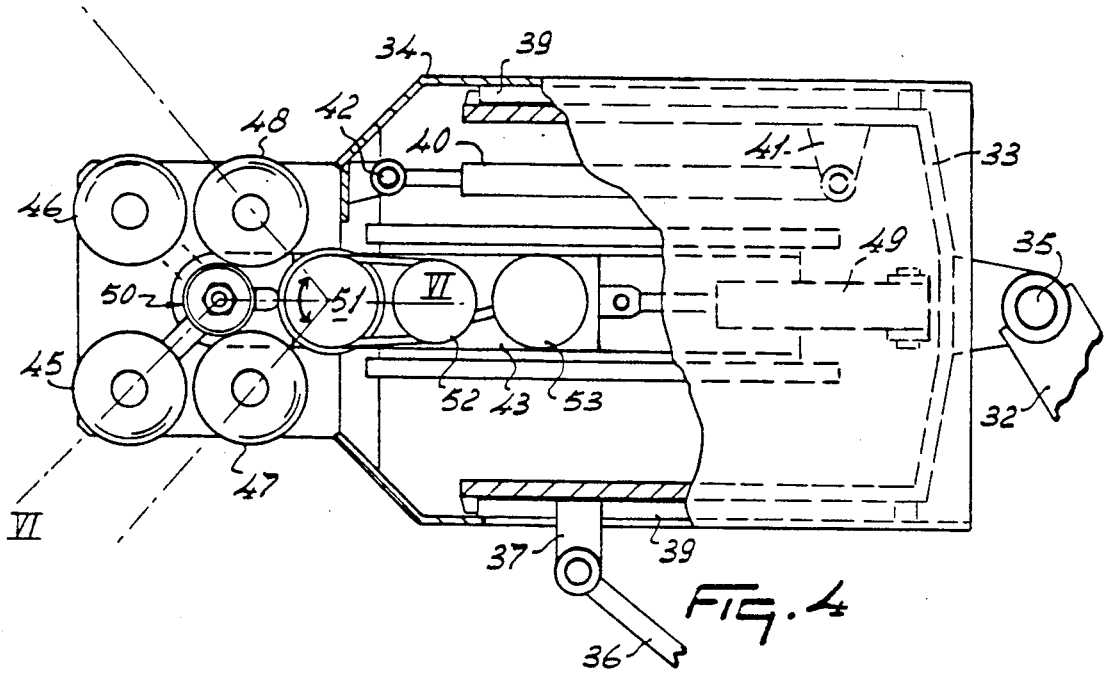
FIG. 4 is a partial sectional plan view of the end of the robot arm.
Figure 5:
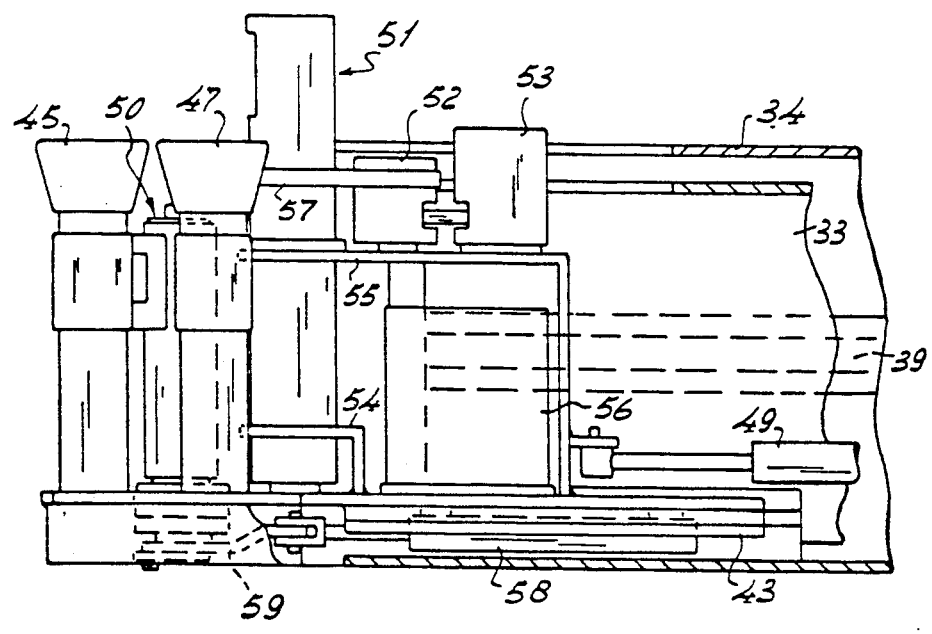
FIG. 5 is a partial sectional side view of the robot arm end as shown in FIG. 4.

Fourth portion 34 of robot arm 6 is provided with a slide 43 which is movable along the longitudinal axis on rails 44. Teat cups 45, 46, 47 and 48 are provided on the end of fourth portion 34 of robot arm 6. Since robot arm 6 approaches the animal's udder from the front side, teat cups 45 and 46 are intended for connection to the animal's rear teats and teat cups 47 and 48 to the front teats. Teat cups 45, 46, 47 and 48 are arranged such that slide 43 can move at least between teats cups 47 and 48. Slide 43 is slid back and forth along the longitudinal axis by a cylinder 49, one end of which is connected to slide 43 and the other end to fourth portion 34 of robot arm 6. Mounted on slide 43 are, as shown from left to right in FIG. 4, coupling means 50, sensor means 51, pivotal mechanism 52 and stepper motor 53, the last two units together constituting the pivotal means for sensor means 51. In the embodiment shown in FIG. 7, the pivotal means comprises a bi-directionally controllable stepper motor. Sensor means 51 is secured on slide 43 by means of supporting plates 54 and 55 (see FIG. 5). Pivotal means 52 and 53 are arranged on supporting plate 55. In addition, slide 43 is provided, under supporting plate 55, with the sensor electronics 56 required for sensor means 51.

Sensor means 51 is mounted such that it is pivotal through a pivotal angle which extends symmetrically to each side of the longitudinal axis of robot arm fourth portion 34. The angle in the embodiment is approximately 120°. Sensor means 51 is reciprocately rotated, by pivotal means 52 and 53, through the pivotal angle in approximately 0.5 second. Stepper motor 53 drives pivotal mechanism 52, while pivotal mechanism 52 causes sensor means 51 to rotate by means of belt 57. Under slide 43 is cylinder 58. Cylinder 58, through the intermediary of a pivotal mechanism 59, allows the rotation of coupling means 50 through a pivotal angle, of approximately 90°, that also extends symmetrically relative to the longitudinal axis of robot arm fourth portion 34. After robot arm fourth portion 34 has been positioned approximately below the animal's udder, sensor means 51 can determine the position of the front teats. When slide 43 has been adjusted to a first position wherein, during the coupling procedure, coupling means 50 can engage teat cups 47 and 48 in order to connect same to the front teats. When, thereafter, slide 43 is extended, it assumes a second position in which, by means of sensor means 51, the position of the rear teats can be determined and in which coupling means 50 subsequently can engage teat cups 45 and 46 in order to connect same to the rear teats. In the first (front) position of slide 43, coupling means 50 can only engage teat cups 47 and 48, and in the second (rear) position teat cups 45 and 46, individually. In both positions, cylinder 58 and pivotal mechanism 59 first adjust coupling means 50 to a position wherein it can, for example, engage teat cup 45 or 47 on one side, then to a position wherein it can engage the respective teat cup 46 or 48 on the other side. Sensor means 51 continues to be permanently operative in order to detect the teat positions located within the pivotal angle, even during the subsequent upward movement of any of the teat cups 45, 46, 47 or 48.

Figure 6:
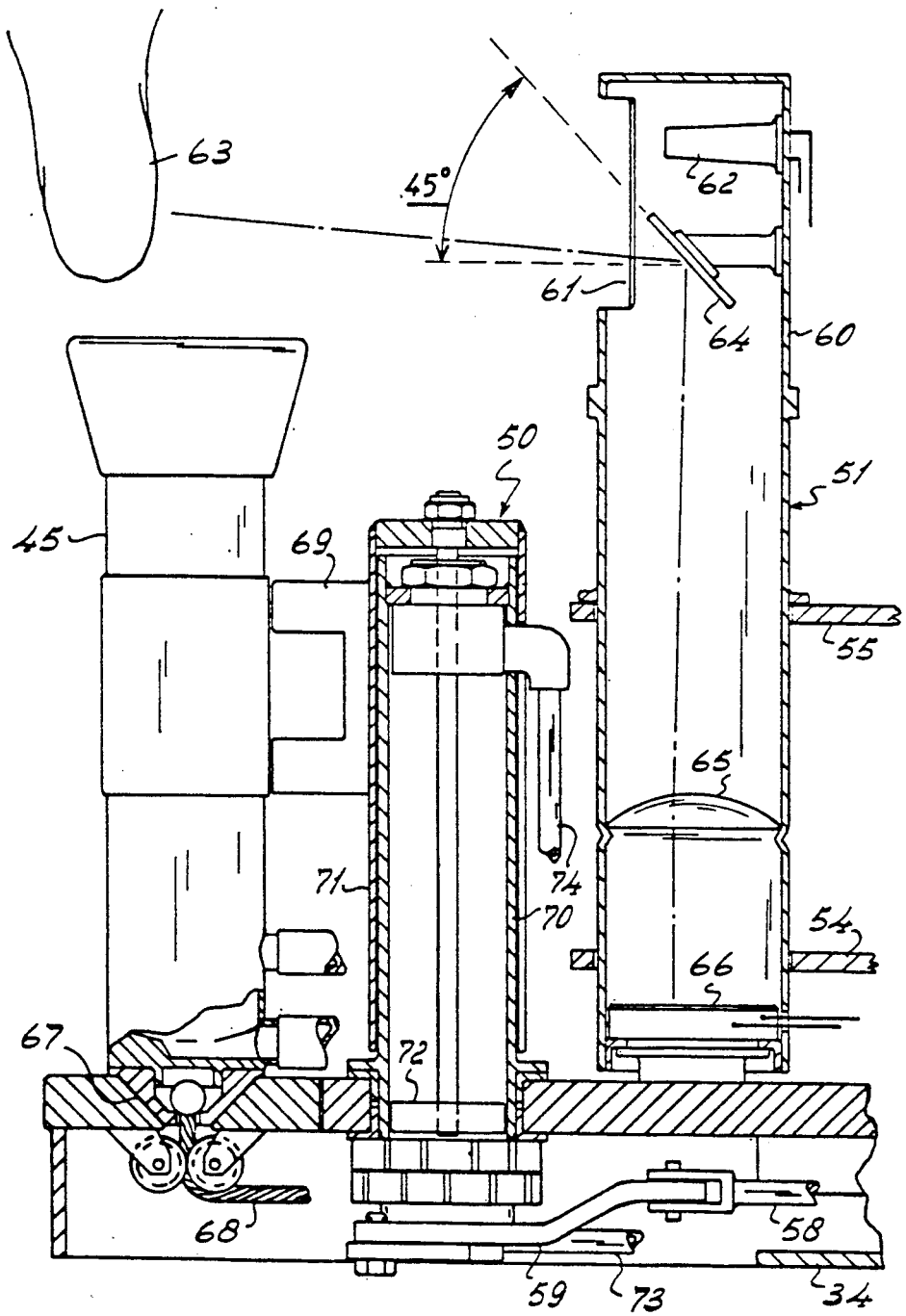
FIG. 6 is a partial cross-sectional view taken on the line VI—VI in FIG. 4.

FIG. 6 shows sensor means 51 in greater detail. Sensor means 51 comprises a housing 60 consisting of a cylindrical sleeve and provided with a laser-transparent window 61 near its upper end. Behind window 61 is arranged a laser transmitter element 62. Transmitter element 62 is controlled by the sensor electronics 56. The use of a laser for sensor means 51 has the advantages of a much narrower scanning beam and a much higher data rate. Therefore, transmitter element 62 is capable of transmitting continuously a narrow scanning beam to determine the position of a teat 63. Teat 63 disperses and/or reflects the radiation transmitted by transmitter element 62. A fraction of the reflected radiation returns, via window 61, into housing 60 and is deflected downwardly by a reflecting element 64. Reflecting element 64 is a flat mirror and is located behind window 61. The reflected radiation is then guided to a receiver element 66, including a diode detector, by a converging lens 65 mounted in housing 60. The region on receiver element 66 where the captured beam is focused, to a greater or lesser extent, determines sensor means 51-teat 63 distance. The signal supplied by receiver element 66 to sensor electronics 56 is indicative of this focusing region. In the present embodiment, the beam transmitted by transmitter element 62 extends substantially horizontally and the mirror is arranged at an angle of approximately 45°. The angular position of teat 63 relative to robot arm fourth portion 34 can further be determined from the time interval in which the reflections are received from teat 63 during the reciprocating rotatory movement of sensor means 51. Using the detected position of a teat 63, with respect to robot arm fourth portion 34, signals are generated by control means (to be described below) to adjust robot arm fourth portion 34 to such a position that a relevant teat cup can be connected to teat 63 by moving the relevant cup upwardly.

As soon as robot arm fourth portion 34 has arrived in the desired position, a relevant teat cup can be connected. In the present embodiment, teat cups 45, 46, 47 and 48 are seated in tapering recesses 67 on robot arm fourth portion 34. Teat cups 45, 46, 47 and 48 are kept in position by flexible connecting members 68 which are coupled to cylinders (not shown) in fourth portion 34 of robot arm 6. Teat cups 45, 46, 47 and 48 can then be moved freely upward and are pulled down again by said cylinders to resume their positions in tapering recesses 67 when the supply of milk stops. The upward movement of the individual teat cups 45, 46, 47 and 48 is effected by coupling means 50 which is provided with an electromagnet 69. Electromagnet 69, after having been energized, engages the teat cup to which electromagnet 69 is directed at that instant. By rotation of coupling means 50 and changing the position of slide 43, electromagnet 69 can be directed to any one of teat cups 45, 46, 47 and 48 which can then be engaged after energizing electromagnet 69. Coupling means 50 includes a vertical inner jacket 70 which is connected rigidly to slide 43. Inner jacket 70 can be rotated by pivotal mechanism 59 through the pivotal angle of, in the embodiment, approximately 90° and is surrounded by an outer jacket 71 which can move only in an upward and downward direction relative to inner jacket 70. Electromagnet 69 is connected rigidly to outer jacket 71. Outer jacket 71 is connected rigidly to a piston 72 which extends through coupling means 50. Compressed air can be applied in the space under piston 72 via a compressed air supply pipe 73, whereby outer jacket 71, and the electromagnet 69 connected thereto and the teat cup engaged thereby, is moved upward. The pressure exerted by the compressed air is such that, as soon as the teat cup contacts the animal's udder and, therefore, a certain counter-pressure is exerted, the upward movement of the teat cup is stopped. When a teat cup has been connected to the relevant teat 63, electromagnet 69 is de-energized and, consequently, the teat cup is no longer retained thereby. Subsequently, compressed air can be passed into the space above piston 72 via compressed air supply pipe 74. When the pressure in supply pipe 73 is less than that in supply pipe 74, outer jacket 71 with electromagnet 69 connected thereto moves downward.

FIG. 7 shows a second arrangement of a laser with associated sensor electronics 56. In this case, both laser 62 and diode detector 66, with associated electronics, are arranged in the lower part of housing 60. The pivotal means for providing pivotal movement of sensor means 51, consists of a bi-directionally controllable stepper motor 75. Sensor electronics 56 comprise a microprocessor 76, an analog-digital converter 77 and a control circuit 78. Laser 62 is activated by the microprocessor 76. When, during its pivotal movement, the laser beam moves across an object, such as the teat of an animal's udder, then diode 66 supplies a signal which is a product of three parameters: the distance d, from the sensor means 51 to the object, and the angles $\alpha_1$ and $\alpha_2$ which indicate the initial angle and the final angle, respectively, of the laser beam as it moves across the object. These parameters are shown in FIG. 8. The distance d determines the focusing position of the reflected/dispersed laser beam on the diode detector, while the position on the diode detector determines the amplitude of the signal supplied thereby (FIG. 7). The angles $\alpha_1$ and $\alpha_2$ are determined by the position of the sensor means 51 at the moment when, during its pivotal movement, the laser beam establishes the "beginning" and the "end" of the object. As the end of each pivotal movement, and hence the beginning of the next one, is signalled by a ES (End Scan) signal, the angles $\alpha_1$ and $\alpha_2$ can be determined by establishing each time the score of a counter, that is the number of steps made by the stepper motor 75, when the diode detector signals the occurrence of the edges of the teat. The magnitude of d, $\alpha_1$ and $\alpha_2$ is determined in the microprocessor 76; for that purpose, the signal from the diode detector 66 is supplied via the analog-digital converter 77 to the microprocessor 76. With the aid of the latter, the sample frequency of the analog-digital converter 77 is set. In addition, the diode detector 66 supplies directly a threshold signal to the microprocessor 76 indicating when the signal supplied via the analog-digital converter 77 should not be considered a valid signal. The stepper motor 75 is controlled by the microprocessor 76. To do so, use is made of a control circuit 78, which receives the following signals from microprocessor 76: an on/off-signal, a signal for determining the rotational direction of stepper motor 75, and a series of pulse-shaped signals, the number of which per unit of time determines the rotational speed of stepper motor 75. Stepper motor 75 also includes an inductive recording element 79 for establishing a reference position. When stepper motor 75 passes the reference position, a signal is supplied by the inductive recording element 79 to microprocessor 76; this signal is important for determining the correct moment at which the various signals are supplied to control circuit 78.

Microprocessor 76 is activated by a second microprocessor 80 (see FIG. 9); to this second microprocessor 80 are supplied the values d, $\alpha_1$ and $\alpha_2$, as well as the ES signal permanently on an interrupt-basis. Each time, on an interrupt-basis, the data d, $\alpha_1$ and $\alpha_2$ and ES are supplied to the second microprocessor 80, the latter sees to it that the position of each cylinder is established. The second microprocessor 80 controls the "searching procedure" for roughly determining the position of the teats of the animal's udder relative to a reference position, the "tracking procedure" for accurately determining the position of the teats of the animal's udder relative to a reference position, the controlled movement of the end of robot arm 6 to this accurately tracked position, and the connection of the teat cups. "Roughly determined" does not imply that an inaccurate measurement is made, but that the measurement registers an instantaneous indication of the teat location for the teat will be moving continuously.

In determining the position of the teats of the animal's udder, the positions of cylinders 18, 22, 36 and 40 are of importance. Each of these cylinders is provided in a known, per se, manner with control electronics 81. To initially adjust fourth portion 34 of robot arm 6 to a centered position below the animal, cylinders 18 and 22 are used. Adjustment along the longitudinal axis is provided roughly by cylinder 18, while cylinder 22 provides the initial height adjustment. Cylinder 22 is also used for the searching movement performed by sensor means 51. For final or accurate position determination and tracking, cylinders 36 and 40 are used. At any moment, as determined by microprocessor 80, the actual position of cylinders 18, 22, 36 and 40 can be supplied via the multiplexer/analog digital converter 82 to microprocessor 80 and be registered in memory means thereof. Conversely, at any moment as determined by microprocessor 80, the desired position of cylinders 36 and 40 can be supplied via the converter/-multiplexer 83 to cylinders 36 and 40. With respect to the cylinders 18 and 22, it is sufficient to supply from the microprocessor 80 only two signals to the relevant control electronics 81. These signals indicate whether cylinders 18 and/or 22 must be activated or stopped and the direction of activation for the cylinders to control fourth portion 34 of robot arm 6. Beside being used to provide the initial rough adjustment of fourth portion 34 of robot arm 6, cylinder 22 also used in adjusting laser 62 in the vertical direction, and hence fourth portion 34 of robot arm 6, during the "searching procedure" to be described hereinafter. The other operating units or cylinders, are also controlled by microprocessor 80.

Cylinders 18, 20, 22, 26, 36, 40, 49 and 58 can be operated either hydraulically, pneumatically or electromagnetically. When hydraulically or electromagnetically operable cylinders are used, it is highly desirable to include an additional overload protection against kicks from the animal. In a preferred embodiment, cylinders 18 and 22, which are used in determining the position of the teats, are electromagnetically operable, while cylinders 36 and 40 are pneumatically operable. In this embodiment, the control electronics 81 are designed such that these cylinders very quickly reach a specific position as determined by the microprocessor. Servo-pneumatic positioning elements, comprising a pneumatic cylinder with associated control electronics, are know, per se, but in the present implement, in co-operation with a laser in the sensor means, they render it possible for the teat cups to be connected to the teats in an extremely fast and efficient manner.

The "searching procedure" as registered in the microprocessor 80 will be set out with reference to the flow diagram of FIG. 9, while the "tracking procedure"

will be set out with reference to the flow diagram of FIG. 10.

When the animal arrives in the milking parlor, she will be identified by means of a conventional animal recognition data source. The animal recognition is of importance to the present invention to the extent that the position of the teats of the animal's udder, relative to a fixed point on the animal, are known for each animal. This positioning, recorded in the animal recognition data source, can be corrected, if necessary, on the basis of the continuously occurring "searching and tracking procedure." For the searching procedure to be implemented it is important that the position of the teats relative to a reference position be registered. Here a point on the center of the animal's hindquarters, as determined by the sensor device 4, is the reference position. Initially, the end of robot arm 6 is brought into a starting position such that laser 62, rather the point in the aperture of the housing wherein the laser is accommodated and from where the horizontal laser scan movement takes place, is located at a predetermined slight distance below and to the middle front of the front teats, for example, fifty millimeters below the front teats and one hundred-twenty millimeters to the middle front thereof. Then actual positions of all cylinders 18, 20, 22, 26, 36, 40, 49 and 58 are registered and laser 62 activated. Cylinder 22 is then activated to move robot arm fourth portion 34 with laser 62 upward, during the upward movement laser 62 performs its scanning movement, each scanning movement taking, for example, one quarter of a second. During the upward movement, the values d, $\alpha_1$ and $\alpha_2$ for the two front teats are registered permanently, as is the associated position for cylinder 22. From the values d, $\alpha_1$ and $\alpha_2$ the position, relative to that of laser 62, of the objects observed is calculated. The objects registered are not yet considered as teats. From the position of the adjustment cylinders, the position of laser 62 relative to the reference position is calculated. The results of these last two calculations are the basis for calculating the position of the objects observed relative to the reference position. The resultant calculated object position is compared with the position data derived from the animal recognition data source. When there is agreement, within certain limits, the observed objects are identified as the animal's front teats, the calculated position for the front teats is registered and the upward movement of cylinder 22 stopped. Laser 62 is then positioned in a starting position below and to the middle front of the rear teats and the above-described procedure is repeated, after which the position of the rear teats is registered. This completes the "searching procedure." In case, during the searching procedure, no agreement within certain limits is established between the calculated position of the objects observed and the relevant data from the animal recognition data source, then the "searching procedure" is continued. In the continuation of the "searching procedure," laser 62 is moved higher and, after having reached its highest position of, for example, one hundred millimeters above its starting position and no agreement has been obtained, returns to the starting position in order to perform another searching movement in the vertical direction. When after a number of searching movements still no teats have been identified, an alarm is activated.

After the searching procedure the tracking procedure is initiated. In the tracking procedure the teats are tracked individually in order to be able to connect a teat cup thereto. For the tracking procedure, the teats are numbered, so that a fixed order can be observed. First, one of the rear teats is tracked, the laser already in the right starting position therefor, that is the position where cylinder 22 stopped during the search for the rear teats. Here again, the data flow derived from laser 62, that is the values of d, $\alpha_1$ and $\alpha_2$, as well as the position of the relevant cylinders, is registered permanently. From the values of d, $\alpha_1$ and $\alpha_2$ the position of the teat relative to laser 62 is calculated continuously and therefrom the difference between the position of the teat relative to the laser and the position of the relevant teat cup relative to the laser is determined. These differences, $\Delta r$ and $\Delta \Phi$, are determined as polar coordinates. When these differences are greater than a threshold value, indicating the teat cup is not quite positioned below the relevant teat, the results of the last measurement are compared with the teat position corrected on the basis of the previous measurement. In the present embodiment, the magnitude of these differences is keyed in Cartesian coordinates. When these differences $\Delta x$, $\Delta y$ are less than a certain or threshold value of, for example, thirty-five millimeters, the appropriate cylinders are activated to move the relevant teat cup, as mounted on fourth portion 34 of robot arm 6, to the last determined teat position. This procedure is repeated until the difference between the position of the teat relative to laser 62 and that of the teat cup relative to the laser 62 is slight enough that the teat cup is located almost directly below the relevant teat. The teat cup is then moved upwardly and connected to the teat. During the upward movement of the teat cup, the tracking procedure remains active, so that even then the teat cup can be adjusted. A vacuum under the teat is used to check whether the teat cup is connected correctly. A vacuum may also be obtained when the teat cup is not connected correctly, in particular when the teat is folded and the teat cup is pressed thereagainst. Therefore, a check whether the teat cup is connected correctly can be made by means of a temperature measurement inside the cup, the temperature of the milk flow being higher than the outside or ambient temperature.

From the final registered position of the teat cup at the moment of connection and the fixed position of the animal's other teats relative to the connected teat, as can be obtained from the teat position determination in the searching procedure, there can be determined a corrected initial position for laser 62 to initiate tracking of the second rear teat. After the laser has been brought to this corrected initial position, the above-described tracking procedure is repeated and the second teat cup connected. Likewise, the third and fourth teat cups are connected, after which the tracking procedure is completed. When, during the tracking procedure, it is established that the differences $\Delta x$, $\Delta y$ are too great, in the present embodiment more than thirty-five millimeters, then the relevant cylinders are not activated, the control of the teat cup is omitted and the tracking procedure is repeated. When this has been done for a number of times and the differences $\Delta x$, $\Delta y$ continue to be too great, the searching procedure is returned to, that is the search for the front teats or the rear teats is again initiated.

The invention is not limited to the embodiment described in the foregoing. It will be obvious that many modifications are possible, such as using, alternatively, two transmitter elements consisting of lasers instead of one transmitter element.

We claim:

1. An implement for milking an animal, such as a cow, comprising:
   a robot arm;
   at least one teat cup and a mounting for said teat cup, said at least one teat cup carried by said mounting near a free end of said robot arm;
   a coupling means for applying each said teat cup to a relevant teat of the animal's udder;
   sensor means for determining the position of each of the teats;
   control means for conveying, on the basis of a teat position as determined by said sensor means, the robot arm to a position under the animal's udder such that said teat cup can be applied to the relevant teat, wherein said sensor is mounted so as to be movable with respect to said mounting for said teat cup on a movable member provided near said free end of said robot arm.

2. An implement as claimed in claim 1, wherein said movable member comprises a slide.

3. An implement as claimed in claim 2, wherein said movable member is movable along a longitudinal axis of said free end of said robot arm.

4. An implement as claimed in claim 3, wherein said movable member can be adjusted to a first position wherein said sensor means can determine the position of the front teats on the animal and to a second position for determining the position of the animal's rear teats.

5. An implement as claimed in claim 1, wherein said sensor means are mounted so as to be capable of reciprocal rotational movement on said movable member.

6. An implement as claimed in claim 5, wherein said sensor means comprise:
   at least one transmitter element;
   a housing, said housing containing said transmitter element and being secured on said movable member;
   a window in said housing such that a scanning beam transmitted by said transmitter element is directed through said window and across said teat cups carried by said free end of said robot arm.

7. An implement as claimed in claim 6, wherein said scanning beam extends substantially horizontally.

8. An implement as claimed in claim 6, wherein said transmitter element comprises a laser.

9. An implement as claimed in claim 6, wherein said housing further contains a receiver element for detecting through said window in said housing a fraction of said scanning beam dispersed by and reflected from an object, more specifically a teat of the animal's udder.

10. An implement as claimed in claim 9, further comprising a reflecting element for guiding the reflected said fraction of said scanning beam incident said reflecting element mounted in said housing behind said window downwardly to said receiver element mounted in a lower part of said housing.

11. An implement as claimed in claim 10, further comprising a converging lens mounted in said housing between said reflecting element and said receiver element.

12. An implement as claimed in claim 9, wherein said receiver element comprises a diode detector.

13. An implement as claimed in claim 1, wherein said sensor means are mounted so as to be pivotably movable on said movable member.

14. An implement as claimed in claim 13, wherein said movable member further comprises pivotal means, said pivotal means pivoting said sensor means through an angle which extends symmetrically relative to the longitudinal axis of said free end of said robot arm.

15. An implement as claimed in claim 14, wherein said pivotal angle of said sensor means is preferably in a range from 90° to 150°, and specifically to to approximately 190°.

16. An implement as claimed in claim 14, wherein said pivotal means further comprises:
   a stepper motor, and a pivotal mechanism means or a bi-directionally controllable stepper motor for pivoting said sensor means.

17. An implement as claimed in claim 1, further comprising coupling means mounted on said movable member.

18. An implement as claimed in claim 17, wherein said coupling means are mounted on said movable member near its forward end in front of said sensor means.

19. An implement as claimed in claim 17, wherein said coupling means are arranged pivotably on said movable member.

20. An implement as claimed in claim 19, further comprising a second pivotal means associated with said movable member, said second pivotal means pivoting said coupling means through a pivotal angle which extends symmetrically relative to the longitudinal axis of said free end of said robot arm between two defined positions.

21. An implement as claimed in claim 20, wherein said second pivotal means for said coupling means further comprises a cylinder connected to said movable member, said cylinder attached to and controlling a pivotal mechanism provided on the lower part of said coupling means.

22. An implement as claimed in claim 17, wherein said movable member can be adjusted to a first position for determining the location of the rear teats with the aid of said sensor means, sequentially engaging relevant said teat cups with said coupling means to place said teat cups on the rear teats, said engaging of said teat cups occurring at defined positions determined by said pivotal means of said coupling means, and to a second position for determining the location of the front teats with the aid of said sensor means, sequentially engaging relevant said teat cups by said coupling means at defined positions to place said teat cups on the front teats.

23. An implement as claimed in claim 17, wherein said coupling means comprises an electromagnet, said electromagnet engaging one said teat cup after said electromagnet has been energized.

24. An implement as claimed in claim 23, wherein said coupling means further comprises an outer jacket to which said electromagnet is attached and a vertical inner jacket, said vertical inner jacket rigidly connected to said movable member, said outer jacket slidably received on said vertical inner jacket such that it is possible for said outer jacket with said electromagnet to be moved in an upward direction.

25. An implement as claimed in claim 17 further comprising control electronics and data processing electronics mounted on said movable member, said control electronics and said data electronics being provided for said transmitter and receiver elements associated with said sensor means respectively.

26. An implement for milking an animal, such as a cow, comprising a sensor means for determining the position of the animal's teats in order to connect said teat cups thereto, said sensor means comprising a source of electromagnetic radiation, such as either a laser or a source of infrared radiation.

27. An implement as claimed in claim 26, wherein said sensor means further comprises a laser transmitter element and a receiving element comprising a diode detector.

28. An implement as claimed in claim 26, wherein said sensor means is enclosed in a housing, said housing arranged on a free end of a robot arm that may be pivoted to a position below the animal's udder, said free end also carrying at least one teat cup.

29. An implement for milking an animal, such as a cow, comprising a sensor means for determining the position of the animal's teats in order to connect said test cups thereto, said sensor means comprising two sensor elements which can be arranged side by side such that two substantially horizontal distance measurements can be made.

30. An implement as claimed in claim 1, wherein movement of said robot arm is effected by at least two cylinders, said cylinder comprising servo-pneumatic positioning elements.

31. An implement for milking an animal, such as a cow, comprising:
a robot arm, said robot arm adapted to carry near its free end at least one teat cup;
coupling means for applying each said teat cup to a relevant teat of the animal's udder;
sensor means for determining the position of the teats; and
control means for conveying, on the basis of each teat's position as determined by said sensor means, said robot arm to a position under the animal's udder such that each said teat cup can be applied to each relevant teat, said control means comprising cylinder which comprise servo-pneumatic positioning element.

32. A method of connecting teat cups to the teats of the udder of an animal, such as a cow, comprising the steps of:
determining the position of the teats with the aid of a sensor means;
moving a robot arm by means of cylinder to position a free end of said robot arm beneath the animal's udder, said free end carrying teat cups;
sequentially carrying each said teat cup upwardly for attachment to a teat wherein said step of determining the position of the teats further comprises the steps of:
pairwise determination of the teat's position;
comparing the results of said pairwise determination with established data; and said sequentially carrying each said teat cup upwardly step further comprises the steps of:
successively moving one of said teat cups to a position substantially directly below a relevant teat; and
connecting said teat cup to sad relevant teat.

33. A method as claimed in claim 32, wherein said steps of determining the position of the teats and moving a robot arm are controlled by a microprocessor, said control by said microprocessor comprising the steps of:
receiving data regarding the objects detected from said sensor means, teat positioning data from an animal recognition data source and actual position data of said cylinders of said robot arm; and calculating the desired position of said cylinders during the steps of determining the position of the teats and sequentially carrying each said teat cup upwardly on the basis of said data.

34. A method as claimed in claim 32, wherein said step of pairwise determination of the teats' position is performed during an upward movement of said sensor means from a position below and int he middle front of a relevant pair of teats, a scanning beam of said sensor means extending substantially in a horizontal plane.

35. A method as claimed in claim 34, wherein during said step of receiving data, as soon as the data received by said sensor means have been processed by said microprocessor to be recognized as originating from the animal's teats, the upward movement of said sensor means is stopped and the step of sequentially carrying each said teat cup is begun.

* * * * *